Feb. 8, 1955 L. R. HEIM 2,701,409
METHOD OF MAKING SWEEPSTICK
Original Filed Aug. 5, 1949 2 Sheets-Sheet 2

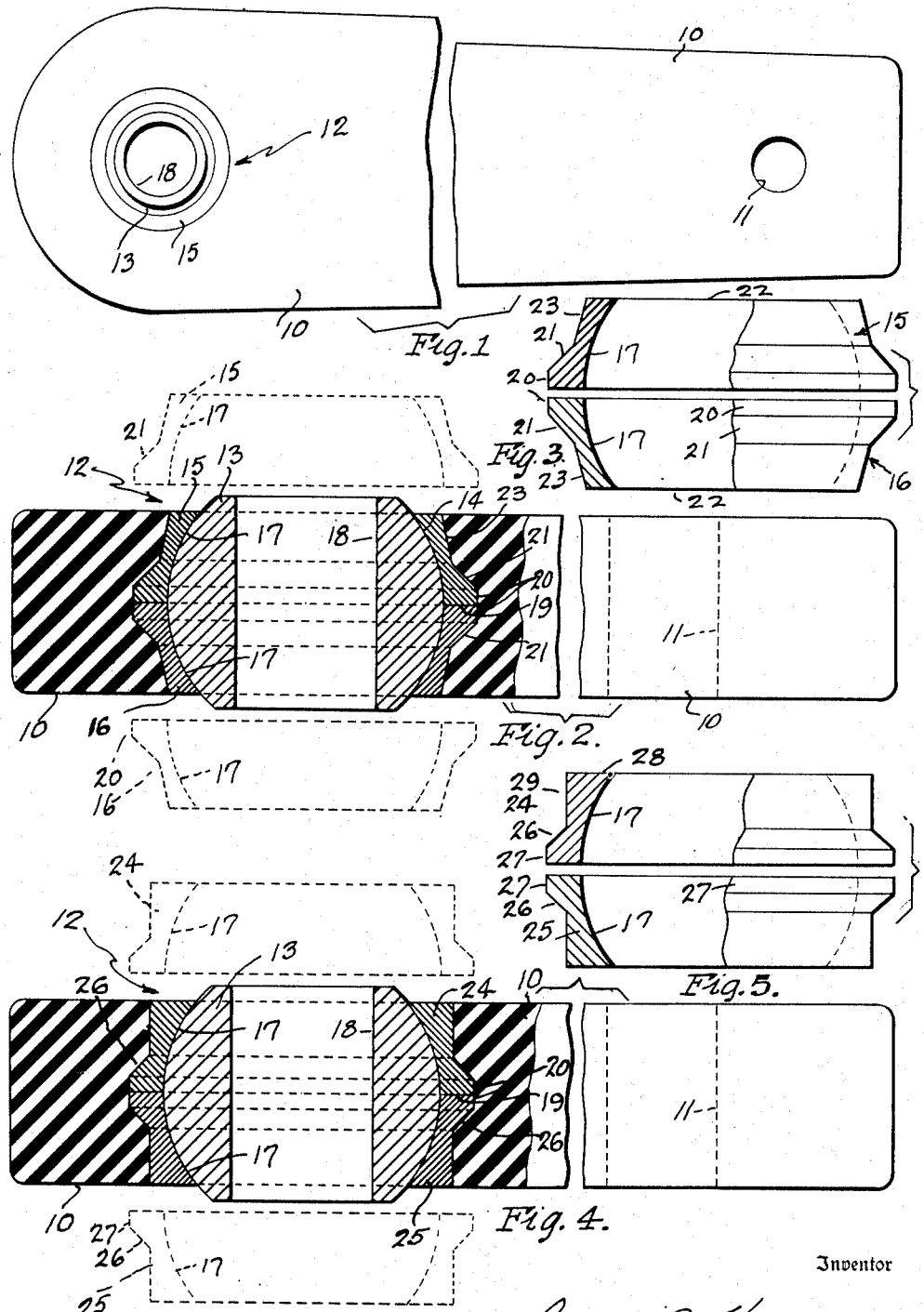

Inventor
By Lewis R. Heim
Wooster & Davis Attorneys

United States Patent Office 2,701,409
Patented Feb. 8, 1955

2,701,409

METHOD OF MAKING SWEEPSTICKS

Lewis R. Heim, Fairfield, Conn., assignor to The Heim Company, Fairfield, Conn., a corporation of Connecticut Original application August 5, 1949, Serial No. 108,704. Divided and this application September 14, 1950, Serial No. 184,802

1 Claim. (Cl. 29—149.5)

This invention relates to sweepsticks for use in looms and the like, and has for an object to provide a new and improved sweepstick which will have sufficient flexibility and resiliency to absorb much of the shocks involved in operating the mechanism in shifting the shuttle back and forth through the shed, and the body portion of which sweepstick is formed of molded material having this flexibility and resiliency.

A further object is to provide such an improved sweepstick with an improved bearing in at least one end which is capable of lateral rocking movement to compensate for misalignment without causing cramping or other binding action, and in which this bearing is so constructed that it has locking means cooperating with the molded material to secure the bearing in the sweepstick.

A sweepstick is used in the mechanism of a loom which forces the shuttle back and forth through the shed. This operation involves a considerable shock to the mechanism which is repeated in every operation of the shuttle. It is desirable to provide this mechanism with sufficient flexibility, yielding and resiliency which will absorb much of the shock incident to the operation of the shuttle and operating mechanism, to thus eliminate as far as possible breakage of the parts and reduce wear. It is also desirable to have a bearing in the sweepstick capable of compensating for misalignment without cramping or binding. In this invention these desirable results are secured by making either the whole body of the sweepstick, or at least a portion of it, of a flexible, resilient, yielding, shock-absorbing material, such, for example, as vulcanized rubber or other suitable plastic, or it could be of any other suitable yielding, resilient, shock-absorbing material capable of being molded about the bearing. A sweepstick of this material not only has a certain amount of yield or resiliency longitudinally to absorb longitudinal strains or shocks, but is also capable of a certain amount of lateral bending or yielding, and by molding in the sweepstick body comprising this material an improved bearing which is capable of lateral rocking movement, the construction effectively absorbs both longitudinal and lateral shock and also compensates for misalignment without binding or cramping effect. By molding the material about the bearing the bearing may be readily locked and secured in position without danger of its working loose or becoming separated from the body of the sweepstick, and the operations of mounting the bearing in the sweepstick are decreased as the bearing may be mounted at the same time and with the operations of molding the body of the sweepstick. This construction greatly increases the life not only of the sweepstick itself, but also the connected mechanism with which it is used, and improving operation of the device as well as greatly increasing its operative life and efficiency.

With the foregoing and other objects in view, I have devised the construction illustrated in the accompanying drawings forming a part of this specification, and the method of making it hereinafter described. It is, however, to be understood the invention is not limited to the specific details of construction and arrangement shown, but may embody various changes and modifications within the scope of the invention.

This application is a division of my prior application Serial No. 108,704, filed August 5, 1949, now Patent No. 2,592,566.

In these drawings:

Fig. 1 is a side elevation of one form of my improved sweepstick;

Fig. 2 is a longitudinal section through one end portion of the sweepstick, the other end portion being shown in elevation;

Fig. 3 is a partial section and partial side elevation of the ring members of the bearing shown in Fig. 2;

Fig. 4 is a partial section and partial side elevation similar to Fig. 2 showing a slight modification;

Fig. 5 is a partial section and partial side elevation of the bearing rings of Fig. 4;

Figure 6:
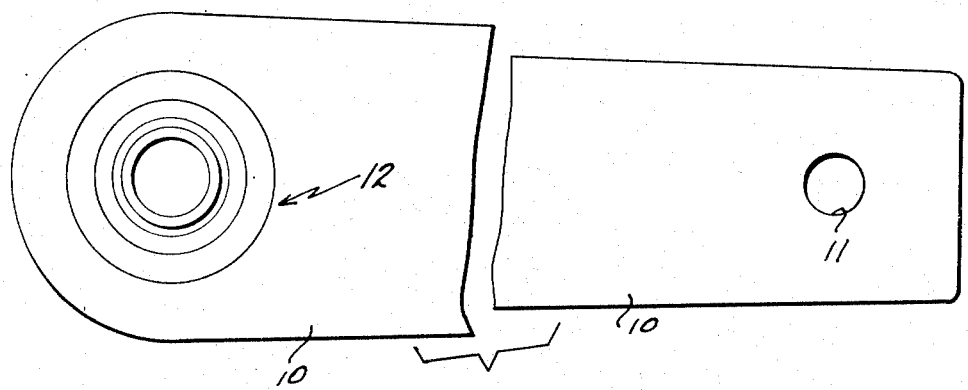
Fig. 6 is a side elevation showing another modified form.

Referring first to Figs. 1, 2 and 3, the stick comprises a body 10 of any suitable cross section, preferably substantially rectangular as shown, formed of some suitable yielding, resilient shock-absorbing material such, for example, as vulcanized rubber or other plastics, which is sufficiently hard and rigid to retain its shape and still have a certain amount of yield, resiliency and flexibility to absorb shocks in operation but still will transmit the necessary force required for this operation. It may be a solid bar of this vulcanized rubber or other plastics, or it could contain strengthening elements (not shown). At one end it may have a bearing 11 for connection to the mechanism with which it is used, and this bearing may be plain or other suitable type of bearing.

At the opposite end it is provided with an improved bearing 12 including an element capable of lateral rocking movement to compensate for misalignment in the parts connected by this sweepstick. In the form of Figs. 1, 2 and 3, this bearing comprises a central metal member 13 of any suitable material, usually steel, the outer surface 14 of which is spherical, and it is mounted in two supporting rings 15 and 16 also of any suitable metal, usually bronze or similar material. These rings have a spherical inner surface 17 corresponding with the outer surface of the spherical member 13 to permit rotary or rocking movement of the member 13 in these rings. The member 13 has a straight bearing 18 for connection with the operating mechanism. This bearing is mounted in the material of the body 10 by molding this material about the bearing. In doing this the bearing is first assembled by placing the two rings 15 and 16 about the member 13, and preferably with their inner ends abutting, as shown at 19 in Fig. 2, and it is then supported by suitable means in the mold to locate it in proper position, and then the material is molded in the mold about the bearing. If the material is a rubber mixture it may be vulcanized by heat and pressure after molding. Means is provided on the bearing for cooperating with the molding material to lock or otherwise retain the bearing in proper position in the molded element. In the form of Fig. 2 each ring 15 and 16 is provided with a peripheral outer flange 20 at its inner end, which is of greater diameter than the body of the ring and the outer wall of which flange is preferably tapered or inclined as shown at 21. At the outer side of this flange the outer surface of the body of the ring between this taper and the outer end 22 of this ring is also preferably inclined or tapered, as shown at 23. With this shape and structure, as the material of the bar is molded about the bearing, the bearing will form a cavity in the material the surfaces of which correspond to the outer surfaces of the ring, and thus the ribs or flanges 20 will form a corresponding peripheral groove in the material which interlocks with the flanges to permanently and effectively mount the bearing in the bar and retain it in proper position therein. Additional means for preventing outward movement of the rings is also provided by the tapered surfaces 23 cooperating with the molded material. The two rings are held together by the molded material.

The form of bearing 12 shown in Figs. 4 and 5 is substantially the same as that of Figs. 2 and 3, except that the rings 24 and 25 corresponding to the rings 15 and 16 of the first form, instead of being tapered or inclined on their outer surfaces between the inclined surfaces 26 of the ribs or flanges 27 and the outer end 28 of the rings, is substantially straight or cylindrical, as shown at 29. Otherwise, the bearing is located and mounted in the body 10 by molding the material about it, the same as in the first form, and the bearing is effectively locked in this material by the peripheral flanges or ribs 27 forming a corresponding groove in the molded material and filling this groove.

Figure 7:
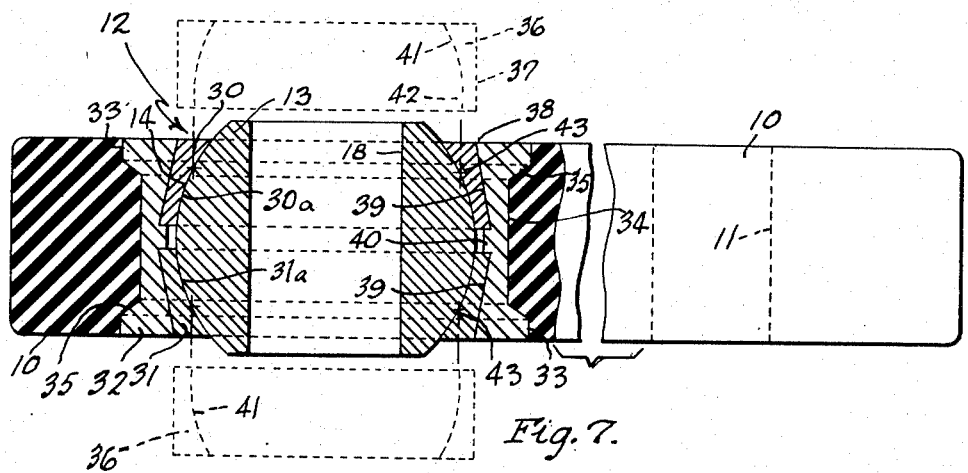
Fig. 7 is a partial longitudinal section and partial side view of the form of Fig. 6.

In the form of the device shown in Figs. 6 and 7, the bearing 12 is molded in the material of the body 10 and is locked therein by a suitable locking means on the bearing cooperating with the material in a similar manner to the forms of Figs. 1 to 5. In this form of the bearing, however, instead of molding the bearing rings 30 and 31 for the spherical bearing member 13 directly in the material of the body 10, they are mounted in an outer metal sleeve 32, this sleeve, however, being part of the bearing structure, and the material of the body 10 is molded about the bearing the same as in the first forms, but in this case is directly molded about the sleeve 32. This sleeve is provided with locking means cooperating with the molded material of the body to position and retain the bearing in this material. In the form of Fig. 7, this sleeve is provided with a peripheral outer flange or rib 33 at the opposite ends of the sleeve with a body portion 34 between these flanges of less diameter, so as to provide between the flanges a wide peripheral groove which is filled by the molded material to effectively lock the bearing in the body member. The inner side walls of the peripheral flanges 33 are preferably inclined or tapered, as shown at 35.

In this construction, the bearing 13 is mounted in the sleeve 32 by forcing two metal rings 36 simultaneously against the opposite sides of bearing member 13. These rings 36, as shown in dotted lines, have an exterior cylindrical surface 37 which is of substantially the diameter of the entrance opening 38 of an inclined socket 39 in the sleeve 32, the wall of the socket tapering inwardly and outwardly, so that its diameter at its inner end is larger than the diameter of inlet opening 38. It will be noted there are two of these sockets on opposite sides of a central rib 40. The inner surface of the ring 36 is partly spherical as shown at 41, and substantially straight adjacent its inner end as shown at 42, the diameter of this inner surface being less than the diameter of the spherical surface 14 of the member 13, so that when these two rings are forced inwardly against the member 13, the inner end of the ring will contact the surface of the member 13 a short distance within the entrance opening 38 or at about the point 43, and as they are further forced against the member 13 the spherical surface of this member will expand the rings outwardly so that they will fill the sockets 39 in the sleeve 32, and will cause the inner surfaces 30a and 31a of the rings to assume the spherical surface of the member 13. This method of assembling the bearing and mounting the member 13 in rings 30 and 31, as shown in Fig. 7, is the method of my prior Patent No. 2,400,506, dated May 26, 1946.

Figure 8:
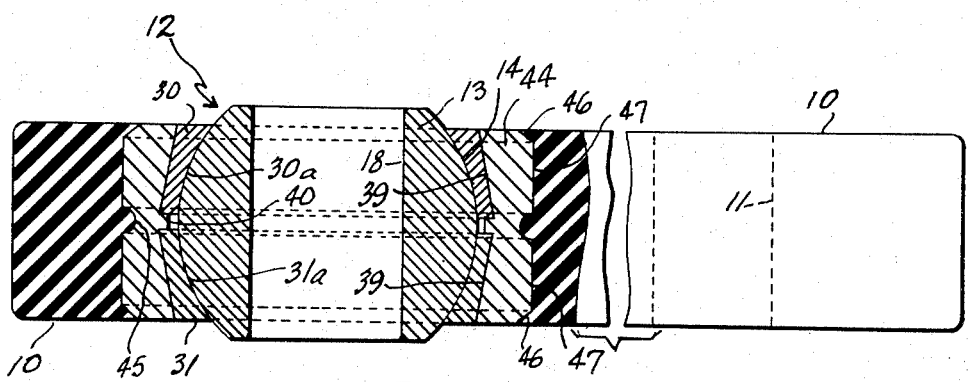
Fig. 8 is a partial longitudinal section and partial side elevation similar to Fig. 7 showing another modification.

In the form shown in Fig. 8, the bearing member 13 and the supporting rings 30 and 31 for this member are the same as shown in Fig. 7, and these bearing members are assembled in the same way in an outer metal sleeve 44. This bearing is molded in the body member 10 the same as in the forms above described. The locking means for retaining the bearing in this material is, however, somewhat different. In this case the sleeve 44 is provided with a peripheral groove 45 at substantially the transverse center thereof, and it is beveled at its outer edges, as shown at 46. When the body of the material is molded about this bearing it will flow into and fill the groove 45 and also flow over the beveled surfaces 46, thus forming cooperating ribs and grooves for locking the bearing in the molded material. The portion 47 of the sleeve between the groove 45 and the bevel 46 is really in effect a rib or flange embedded in the molded material in a correspondingly shaped groove to lock the bearing in the bar.

It will be seen from the above that in all the forms of the device shown, the bearing is molded in the flexible resilient material of the body 10 of the sweepstick, and that in each instance the bearing is provided with locking means cooperating with the molded material to effectively secure the bearing in its proper position within the body of the sweepstick; also that in each form the bearing and the material have cooperating ribs and grooves for locking the bearing in the body members. It will be understood that other shapes and arrangements of locking means may be used.

This construction and arrangement provides a very effective means for mounting and securing the bearing in the body of the sweepstick, and the operation of mounting this bearing in the sweepstick can be performed in the same operation as that of forming the stick, eliminating separate operations for this purpose. Also, this molded construction effectively locks the bearing in the material so that there is no danger of its working loose or shifting out of position, and therefore it will maintain its proper position in the sweepstick indefinitely.

Having thus set forth the nature of my invention, I claim:

A method of making a sweepstick for looms and the like which comprises providing a sleeve with external locking means; assembling in said sleeve a spherical bearing member by pressing a pair of separate supporting rings of less internal diameter than the member against said member from opposite sides thereof to expand the rings about said member and against the sleeve to mount said member in the rings and also mount the rings in the sleeve, and mounting the bearing by molding a connecting bar of nonmetallic resilient material about said sleeve and against and interlocking with the locking means to yieldingly mount and retain the bearing in the bar.

References Cited in the file of this patent

UNITED STATES PATENTS

| | | |
|---|---|---|
| 1,867,540 | Rosenberg | July 12, 1932 |
| 1,895,093 | Carlson | Jan. 24, 1933 |
| 1,903,776 | Clark et al. | Apr. 18, 1933 |
| 2,005,004 | Peo | June 18, 1935 |
| 2,181,136 | Knox | Nov. 28, 1939 |
| 2,182,487 | Chadbourne et al. | Dec. 5, 1939 |
| 2,366,668 | Heim | Jan. 22, 1945 |
| 2,381,391 | Brown | Aug. 7, 1945 |
| 2,445,745 | Moe | July 20, 1948 |
| 2,476,728 | Heim | July 19, 1949 |
| 2,592,566 | Heim | Apr. 15, 1952 |